(12) United States Patent
Wang et al.

(10) Patent No.: US 11,210,761 B1
(45) Date of Patent: Dec. 28, 2021

(54) CIRCUITRY TO DETERMINE SET OF PRIORITY CANDIDATES

(71) Applicant: Apple Inc., Cupertino, CA (US)

(72) Inventors: Liang-Kai Wang, Austin, TX (US); Vinod Reddy Nalamalapu, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/131,052

(22) Filed: Dec. 22, 2020

(51) Int. Cl.
*G06T 1/20* (2006.01)

(52) U.S. Cl.
CPC .................................. *G06T 1/20* (2013.01)

(58) Field of Classification Search
CPC ........................................................ G06T 1/20
USPC ................................................. 345/501, 522
See application file for complete search history.

(56) References Cited

U.S. PATENT DOCUMENTS

| 4,467,444 A | 8/1984 | Harmon, Jr. et al. |
| 4,785,393 A | 11/1988 | Chu et al. |
| 5,961,635 A | 10/1999 | Guttag et al. |
| 2011/0170600 A1* | 7/2011 | Ishikawa ............... H04N 19/176 |
| | | 375/240.16 |
| 2019/0205751 A1* | 7/2019 | Cheung .................. G06N 5/046 |

* cited by examiner

*Primary Examiner* — Jacinta M Crawford
(74) *Attorney, Agent, or Firm* — Kowert, Hood, Munyon, Rankin & Goetzel, P.C.

(57) ABSTRACT

Techniques are disclosed relating to selecting a number of candidates based on priority. In some embodiments, position determination circuitry receives an input vector that orders a set of potential candidates from a highest-priority position within the input vector to a lowest priority position. In some embodiments, it determines, starting from a first end of the input vector and based on non-overlapping groups of candidates, a particular position within the input vector at which a threshold number of available candidate are found. This may include to generate respective count values within the groups of candidates, identify a transition group in which the particular position is located based on accumulation of the respective count values, and identify the particular position within the transition group. Output circuitry may generate, based on the particular position, an output vector that indicates the threshold number of available candidates from the input vector.

20 Claims, 8 Drawing Sheets

*Example input vector Q*
  00110100010100000110000001001110000010000000111

*Example desired output vector V*
  00000000000000000000000001001110000010000000111

*Q divided into five groups of N=8 candidates*

| Group 5 | Group 4 | Group 3 | Group 2 | Group 1 | Group 0 |
|---|---|---|---|---|---|
| 00110100 | 01010000 | 01100000 | 01001110 | 00001000 | 00000111 |

*Count of valid candidates within each group:*

| 0011 | 0010 | 0010 | 0100 | 0001 | 0011 |
|---|---|---|---|---|---|

*Accumulated valid candidate counts among groups M:*

| 1111 | 1100 | 1010 | 1000 | 0100 | 0011 |
|---|---|---|---|---|---|

*Generate count of valid candidates up to each index within each group P:*

| 33321100 | 22110000 | 22100000 | 44333210 | 11111000 | 33333321 |
|---|---|---|---|---|---|

*Within transition group (the first group with most significant bit of M set), the cutoff bit position is the index where the M value for the previous group plus the P value for the current index reaches N.*

*Example mask*
  00000000000000000000000001111111111111111111111

*FIG. 4*

CIRCUITRY TO DETERMINE SET OF PRIORITY CANDIDATES

BACKGROUND

Technical Field

This disclosure relates generally to computer processors and more particularly to circuitry configured to find a set of highest or lowest-priority available candidates in a set.

Description of the Related Art

Computer processors may encounter various situations where candidates are selected based on priority from a set of available candidates. As one example, a graphics processor may schedule work for execution on a shader core from among a set of available work, based on priority of clients and which clients have work available. As another example, candidates may be selected to write to a data buffer based on priority. Circuitry to select a certain number of valid candidates from a pool based on priority typically uses significant resources (e.g., chip area and power) and selection results are often needed in a timely manner.

BRIEF DESCRIPTION OF THE DRAWINGS

FIG. 4 is a diagram illustrating example intermediate values generated by selection circuitry operating on an input vector, according to some embodiments.

DETAILED DESCRIPTION

Graphics Processing Overview

Figure 1A:
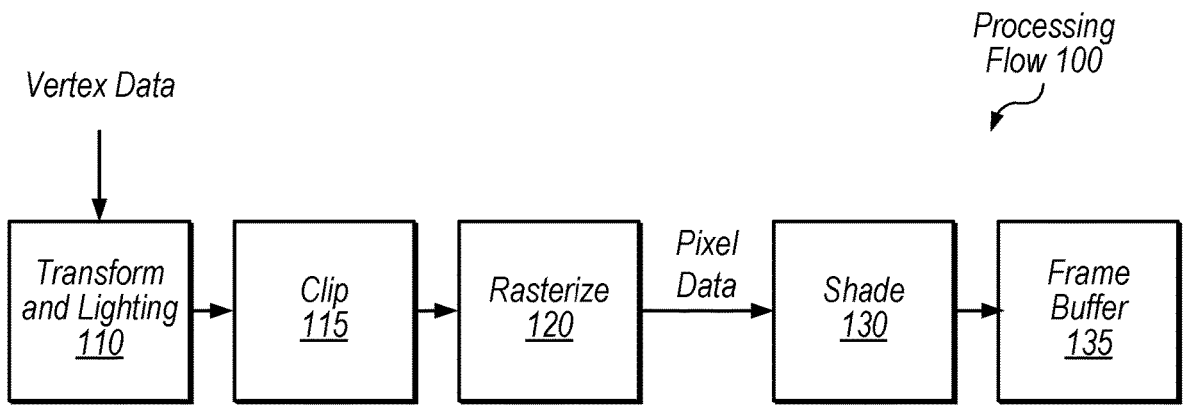
FIG. 1A is a diagram illustrating an overview of example graphics processing operations, according to some embodiments.

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
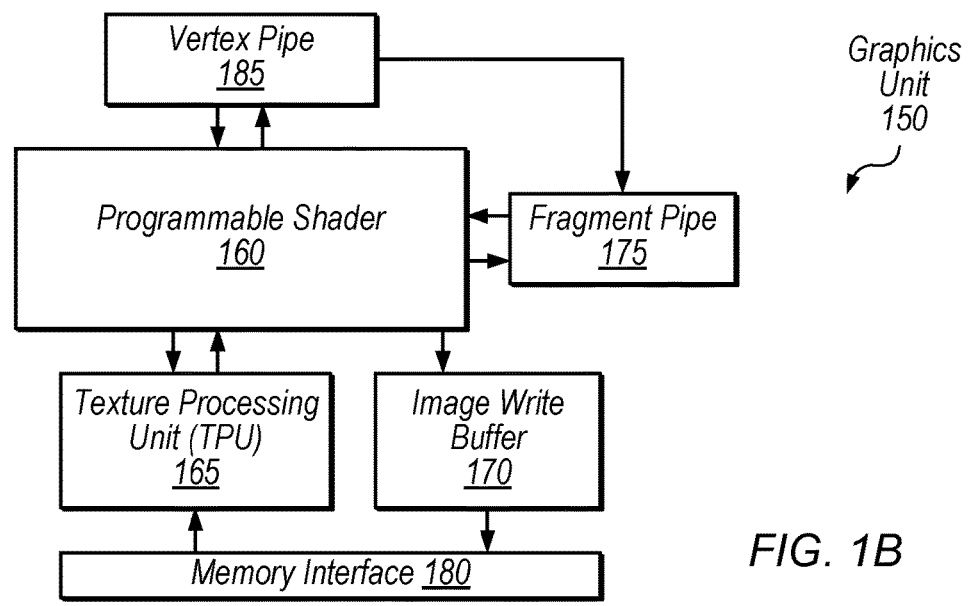
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write unit 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

Overview of Priority-Based Candidate Selection

In various embodiments discussed herein, circuitry is configured to select a certain number of candidates (e.g., an integer N) from a greater number of potential candidates. In some embodiments, the candidates are represented using an input vector of bits. Each bit may indicate whether a candidate is available. The position within the vector may indicate priority of the candidate. For example, the highest-priority candidate may be represented by the most significant bit or the least significant bit with the lowest-priority candidate on the other end of the vector, with increasing or decreasing priority between these two positions.

As one example, the following vector for sixteen candidates is arranged with the highest-priority potential candidate at the least-significant (right-most) bit and nine candidates are available: 0101000011111101.

In some embodiments, selection circuitry is configured to generate a mask vector to AND with the input vector to generate an output vector with the selected candidates. For example, to select the eight highest-priority available candidates in the example above, the selection circuitry might generate a mask 0001111111111111. When ANDed with the input vector, this generates the output vector 0001000011111101, which includes the eight highest-priority candidates.

The input and output vector formats discussed herein are included for purposes of explanation, but are not intended to limit the scope of the present disclosure. In other embodiments, candidates may be represented using various appropriate numbers of bits and priority may be encoded using various appropriate formats.

The disclosed circuitry discussed in detail below may process groups of candidates within an input vector for intermediate operations to perform overall selection operations. The disclosed techniques may advantageously reduce area and power consumption, increase performance, or both, relative to traditional techniques.

Figure 2:
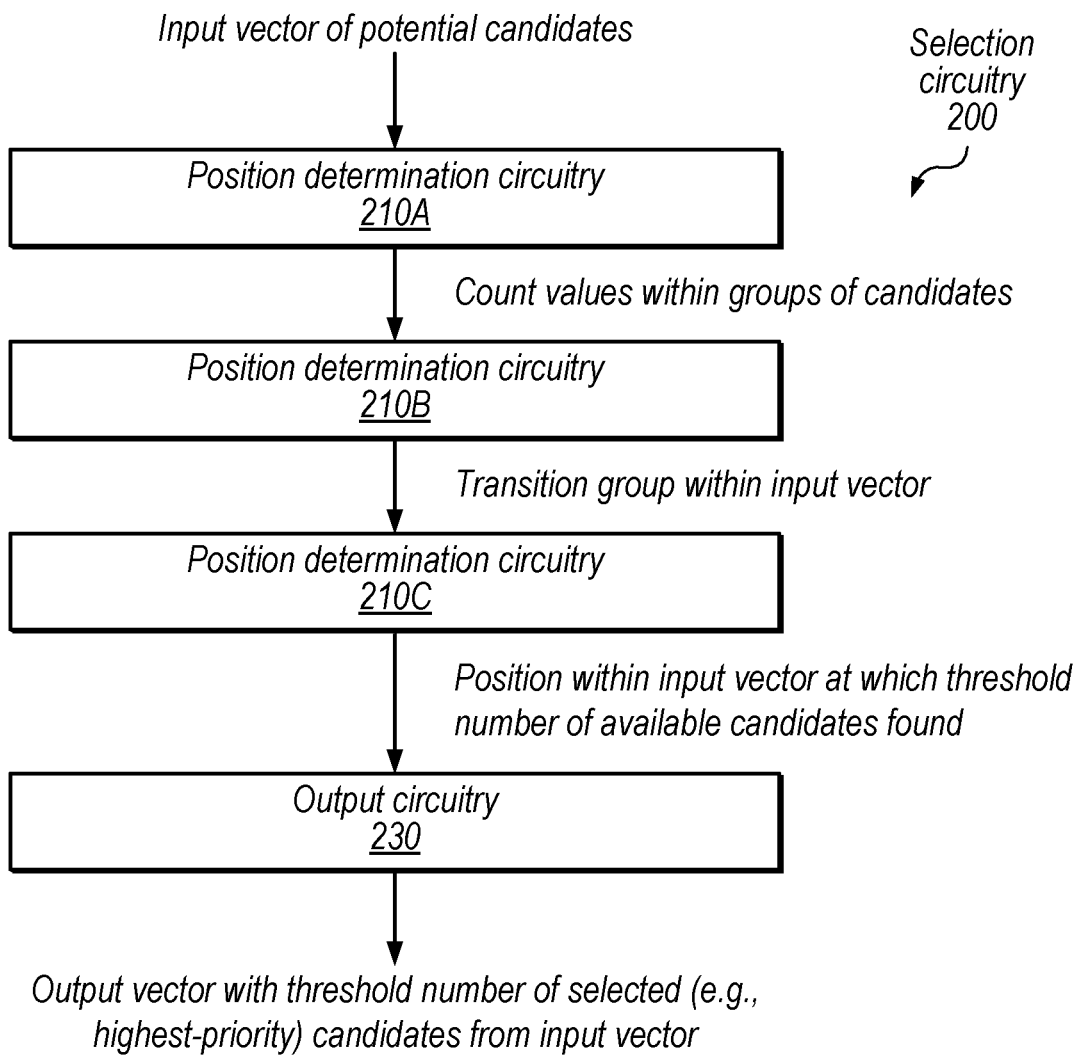
FIG. 2 is a block diagram illustrating example selection circuitry configured to operate on groups of candidates within a vector, according to some embodiments.

FIG. 2 is a block diagram illustrating example selection circuitry configured to operate on groups of candidates within a vector, according to some embodiments. In the illustrated embodiment, the selection circuitry includes position determination circuitry 210A-210C and output circuitry 230. Note that FIG. 2 provides a high-level overview of selection circuitry while FIGS. 3-4, discussed below, provide more detailed example circuitry and operations.

Position determination circuitry 210A, in the illustrated embodiment, is configured to receive an input vector of potential candidates and generate count values within groups of candidates. For example, circuitry 210A may split the vector into Q groups and generate Q different counts representing the available candidates in each group.

Position determination circuitry 210B, in the illustrated embodiment, is configured to determine a transition group within the input vector. The transition group, in some embodiments, is the group that includes the $N^{th}$ available candidate, starting from one end of the input vector (where N is the number of candidates that the circuit is configured to select). Circuitry 210B may generate accumulated counts for each group (where each group accumulates its own count and counts from all prior groups in the direction of the end of the input vector) and identify the transition group as the first group whose count reaches N.

Position determination circuitry 210C, in the illustrated embodiment, is configured to determine a position within the input vector at which the threshold number of available candidates is found. In some embodiments, circuitry 210C determines this position based on the accumulated counts from circuitry 210C and a count array that indicates, for at least the transition group, a cumulative number of available candidates at each position in the transition group.

Output circuitry 220, in the illustrated embodiment, is configured to generate an output vector with the threshold number of selected candidates (e.g., N highest-priority or N lowest-priority) from the input vector. For example, output circuitry 220 may generate a mask based on the position from circuitry 210C and apply the mask to the input vector to generate the output vector.

Detailed Example Circuitry and Vector Processing

Figure 3:
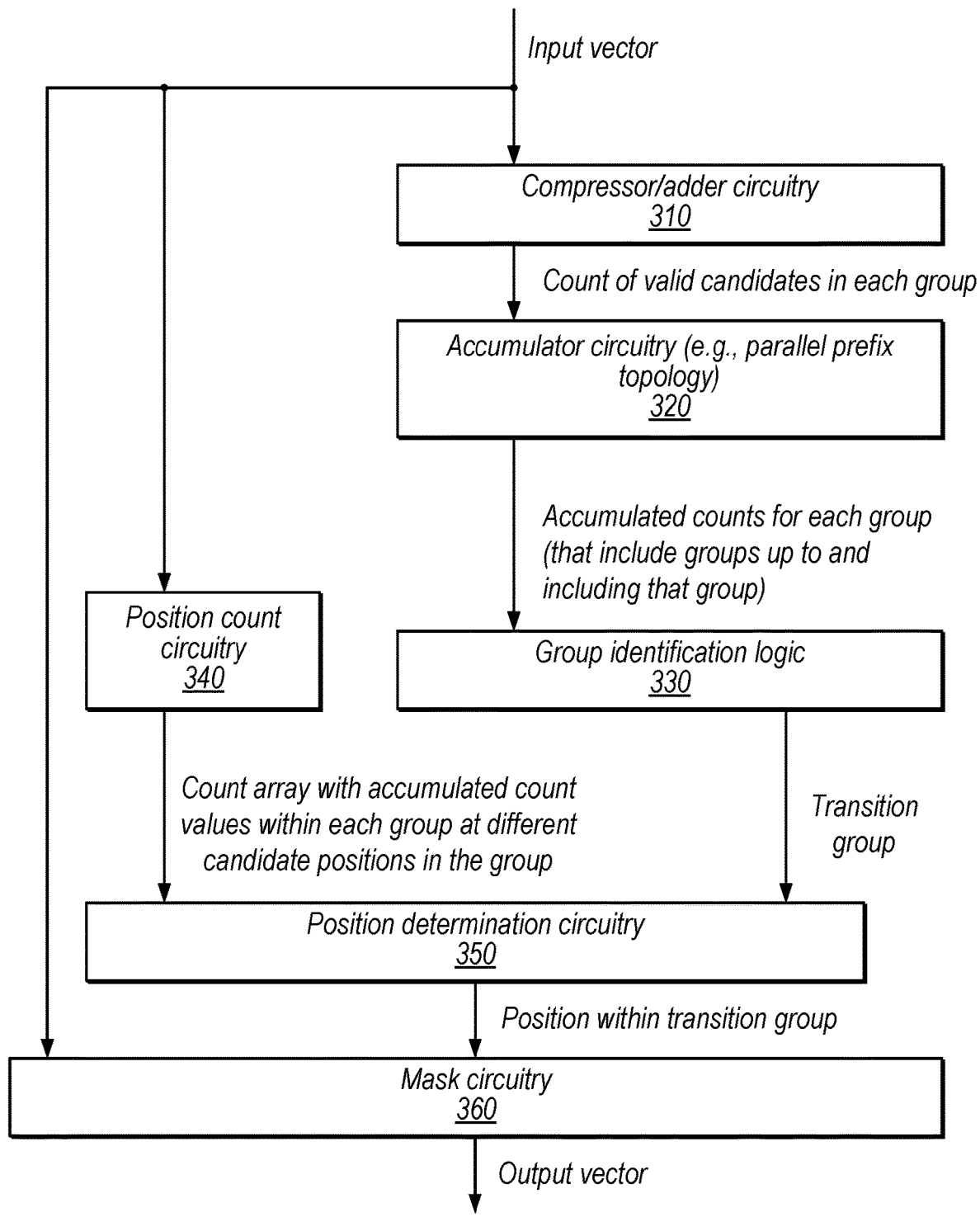
FIG. 3 is a block diagram illustrating more detailed example selection circuitry, according to some embodiments.

FIG. 3 is a block diagram illustrating more detailed example selection circuitry, according to some embodiments. In the illustrated embodiment, the selection circuitry includes compressor/adder circuitry 310, accumulator circuitry 320, group identification logic 330, position count circuitry 340, position determination circuitry 350, and mask circuitry 360. The circuitry of FIG. 3 will be described briefly below while FIG. 4 provides a more detailed example of operations and results from various elements of FIG. 3.

Compressor/adder circuitry 310, in the illustrated embodiment, is configured to operate on the input vector to generate a count of validate candidates in each of multiple non-overlapping groups of candidates. Accumulator circuitry 320, in the illustrated embodiment, is configured to operate on the counts for each group to generate accumulated counts for each group that include counts for groups up to and including that group (starting from one end of the input vector). Group identification logic 330, in the illustrated embodiment, is configured to identify a transition group based on the accumulated counts.

Position count circuitry 340, in the illustrated embodiment is configured to generate a count array with accumulated count values within groups at different candidate positions in the group. In some embodiments, position count circuitry 340 may generate an array only for the transition group. In other embodiments, position count circuitry 340 may generate an array for each group, e.g., to allow circuitry 340 to operate at least partially in parallel with one or more of elements 310, 320, and 330.

Position determination circuitry 350, in the illustrated embodiment, is configured to determine the position within the transition group at which the $N^{th}$ available candidate is found. Mask circuitry 360, in the illustrated embodiment, is configured to generate the output vector based on this position.

FIG. 4 is a diagram illustrating example intermediate operations by selection circuitry operating on an input vector, according to some embodiments. In the illustrated example, the input vector Q includes 48 bits representing potential candidates, with the least-significant bit representing the highest-priority candidate. In this example, the selection circuitry is configured to generate an output vector V that includes the eight highest-priority available candidates.

In this example, circuitry 310 operates on six groups (group 0 through group 5) with N=8 candidates in each group. In some embodiments, the number of bits per group corresponds to the number of desired candidates in the output vector, although other implementations are contemplated. In the illustrated example, circuitry 310 generates a count of valid candidates in each group. The count for group 0 is three (0011 in binary) the count for group 1 is one (0001 in binary) and so on. In some embodiments, the number of bits used to represent the count for each group is the number of bits needed to represent N in an unsigned integer format.

In some embodiments, circuitry 310 utilizes 4:2 compressors. For example, circuitry 310 may include a level 1 with two compressors for each group that operate on indices 0-3 and 4-7 within each group respectively. This may generate one early carry, one late carry, and one sum bit for each four-bit portion of the group. A compressor is a well-known circuit element with multiple potential underlying circuit implementations. A 4:2 compressor, for example, receives four inputs (e.g., bits at indices 0-3 of each group, as discussed above) and potentially a carry-in signal and generates a carry, a sum, and a carry-out. As referred to above, the two output carry signals may be also referred to as an early carry and a late carry. A 4:2 compressor may be built from two serially connected full adders or two cascaded 3:2 compressors, for example.

Circuitry 310 may also include a level 2 that merges the outputs from level 1 using another 4:2 compressor and one half adder for each group. Circuitry 310 may also include a level three that adds the sum from level 2 and early and late carries from level 2 to provide the number of 1's in each group (e.g., using an AND gate to obtain the carry and an XOR gate to determine the sum bit). Note that some of the sum and carry results from above may be used as inputs to generate the P vector as well. Further note that the example compressor sizes discussed herein are included for purposes of illustration but are not intended to limit the scope of the present disclosure. Other numbers of compressor inputs and outputs are contemplated. Further, other non-compressor types of circuits may be used to perform disclosed operations in other embodiments.

In the illustrated example, circuitry 320 generates accumulated valid candidate counts (referred to as a vector M) among groups. For example, group 0's accumulated count is simply its group count. Group 1's accumulated count includes the counts from group 1 and group 0. Group 2's accumulated count includes the counts from groups 0-2, and so on. Group identification logic 330 determines the transition group based on vector M. In particular, in embodiments with a number of bits in M for each group that is the number of bits needed to represent N in an unsigned integer format (e.g., four bits for N=8), logic 330 may select the first group, starting from the right side of the vector, whose most-significant bit is 1. In the illustrated example, Group 2 has the first non-zero most significant bit in M (an M value of 1000) and therefore is the transition group. Logic 330 may be configured to indicate the transition group by ANDing the most-significant bit of each group with the inverse of the most-significant bits of all previous groups, for example.

Note that the number of levels of the merging procedure to generate M may be log 2(ceil(Q/N)). In the illustrated example, this may include three levels of a parallel-prefix arrangement. For example, using a Ladner-Fischer topology, each odd group may be summed with the previous groups (e.g., group 1 with group 0, group 3 with group 2, etc.), those results may then be summed with adjacent results (e.g., the result of groups 3+2 and 1+0 summed, etc.). This procedure may continue until an accumulated result is generated for each group or may end when the transition group is identified. Each level may implement a three-bit adder plus an OR gate to OR the bit3 of the groups being merged, for example.

In the illustrated example, position count circuitry 340 generates a count of valid candidates up to each index within each group, referred to as array P. For group 2, in this example, the P array is "44333210." As discussed above, circuitry 340 may generate all or a portion of array P in parallel with the operations to generate M discussed above.

In the illustrated example, within the transition group, position determination circuitry 350 determines the cutoff bit position based on M and P. In particular, the bit position is the index of P at which the sum of the P value for that index and the M value for the previous group reaches N. In the illustrated example where N=8, the transition group is group 2, the M value for the previous group (group 1) is four, and the cutoff index within P is six (P[group 2][index 6]=4 and 4+4=8).

FIG. 4 shows an example mask based on this index, which, when ANDed with the input vector Q, provides the desired output vector V. The following code provides example operations that may be implemented by position determination circuitry 350 and mask circuitry 360, in some embodiments. Note that the mask may not exactly identify the location of the $N^{th}$ candidate, in some embodiments, but may always provide an output vector with N candidates when applied to the input vector.

```
mask [Grp #] [7:0]=
// Set mask to 0's for groups lower than transition
(M[Grp #-1] [3]==1'b1) ? 8'h00:
// Set mask for group to 1's for groups higher than
// transition
(M[Grp #-1] [3]==1'b0)
(M[Grp #] [3]==1'b0): 8'hff;
// Set mask for transition group
group_mask [Grp #] [7:0];
for (index=0; index<8; index++) {
  mask [Grp #] [index]=
    // set bit if P+M for prev group reaches N
    ((P[Grp #] [index] [3:0] +M[Grp #-1])<=8) ? 1'b1:
      1'b0;
}
```

Using the discussed example circuitry and a Ladner-Fischer topology, the elements of FIG. 3 may be implemented using log 2(ceil(Q/N))*(2 XOR+2 AOI22)+(1 XOR+2 AOI22)+5 XOR logic levels. Other topologies may be implemented in other embodiments, e.g., based on design tradeoffs between the number of logic levels and area budget.

In some embodiments, selection circuitry may be dedicated to generate the N highest-priority candidates for a fixed value of N, while in other embodiments the circuitry may be programmable to generate results for multiple different values of N.

The disclosed circuitry may be used for various applications. As one example, a graphics processor may schedule work for execution on a shader core from among a set of available work, based on priority and which clients have work available. As another example, a processor may select candidates to write to a data buffer based on priority. In these and various other appropriate applications, the disclosed circuitry may provide advantages in terms of performance, area, power consumption, or any combination thereof. Further, area and power savings enabled by disclosed embodiments may exponentially increase as the number of candidates to be selected grows.

Example Method

Figure 5:
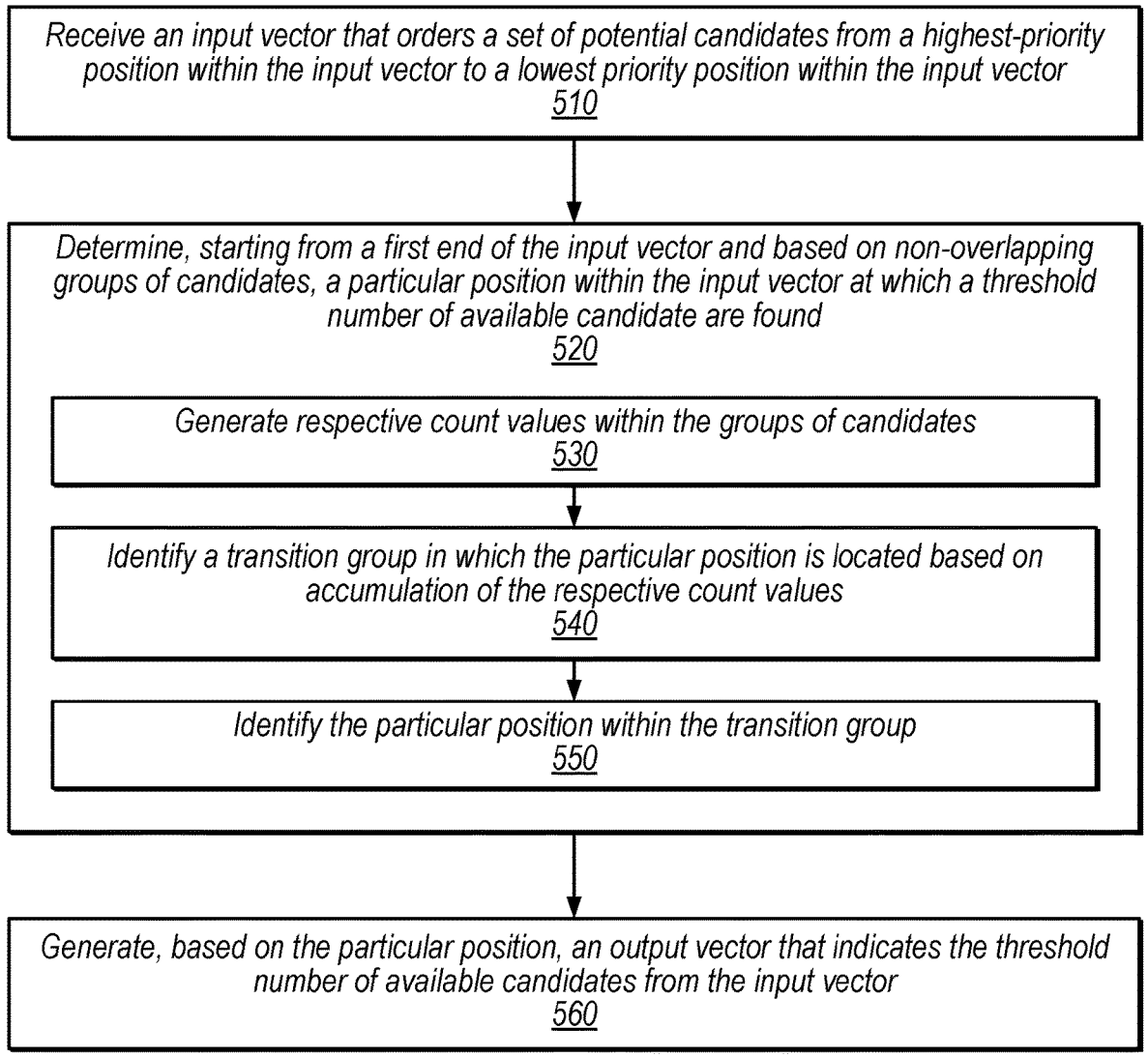
FIG. 5 is a flow diagram illustrating an example method for selecting candidates based on priority, according to some embodiments.

FIG. 5 is a flow diagram illustrating an example method for selecting candidates based on priority, according to some embodiments. The method shown in FIG. 5 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 510, in the illustrated embodiment, position determination circuitry receives an input vector that orders a set of potential candidates from a highest-priority position within the input vector to a lowest priority position within the input vector.

At 520, in the illustrated embodiment, position determination circuitry (e.g., circuitry 310, 320, 330, 340, and 350), determines starting from a first end of the input vector and based on non-overlapping groups of candidates, a particular position within the input vector at which a threshold number of available candidate are found. In the illustrated embodiment, this includes elements 530-550.

At 530, in the illustrated embodiment, position determination circuitry (e.g., circuitry 310) generates respective count values within the groups of candidates. In some embodiments, respective groups of the non-overlapping groups of candidates include the threshold number of potential candidates. In some embodiments, the input vector includes a bit per candidate that indicates whether the candidate is valid.

At 540, in the illustrated embodiment, position determination circuitry (e.g., circuitry 330) identifies a transition group in which the particular position is located based on accumulation of the respective count values (e.g., as generated by circuitry 320).

At 550, in the illustrated embodiment, position determination circuitry (e.g., circuitry 350) identifies the particular position within the transition group. In some embodiments, the position determination circuitry includes count array circuitry configured to generate, for at least the transition group, a count array (e.g., P) indicating a cumulative number of available candidates at each position in the transition group, starting at an end of the group that is closest to the first end of the input vector. In some embodiments, identification of the particular position within the transition group is based on the count array for the transition group and the accumulated count from an adjacent group to the transition group that is nearer to the first end of the input vector. In some embodiments, the particular position is the position at which a sum of the count array value for that position and the accumulated count from the adjacent group meets the threshold number of candidates. In some embodiments, the count array circuitry is configured to generate respective count arrays for multiple groups of the non-overlapping groups of candidates and is configured to generate the respective count arrays at least partially in parallel with generation of the respective count values.

In some embodiments, the position determination circuitry includes multiple compressors and one or more half adders configured to generate the respective count values within groups of candidates and parallel prefix network circuitry configured to accumulate the respective count values starting from the first end of the input vector. In some embodiments, the parallel prefix network circuitry implements one of the following topologies: Ladner-Fischer, Brent-Kung, Kogge-Stone, or Han-Carlson.

At 560, in the illustrated embodiment, output circuitry (e.g., mask circuitry 360) generates, based on the particular position, an output vector that indicates the threshold number of available candidates from the input vector. In some embodiments, the output vector indicates the threshold number of highest-priority available candidates from the input vector. In some embodiments, the output circuitry is configured to generate a mask based on the determined position and to apply the mask to the input vector to generate the output vector.

Example Device

Figure 6:
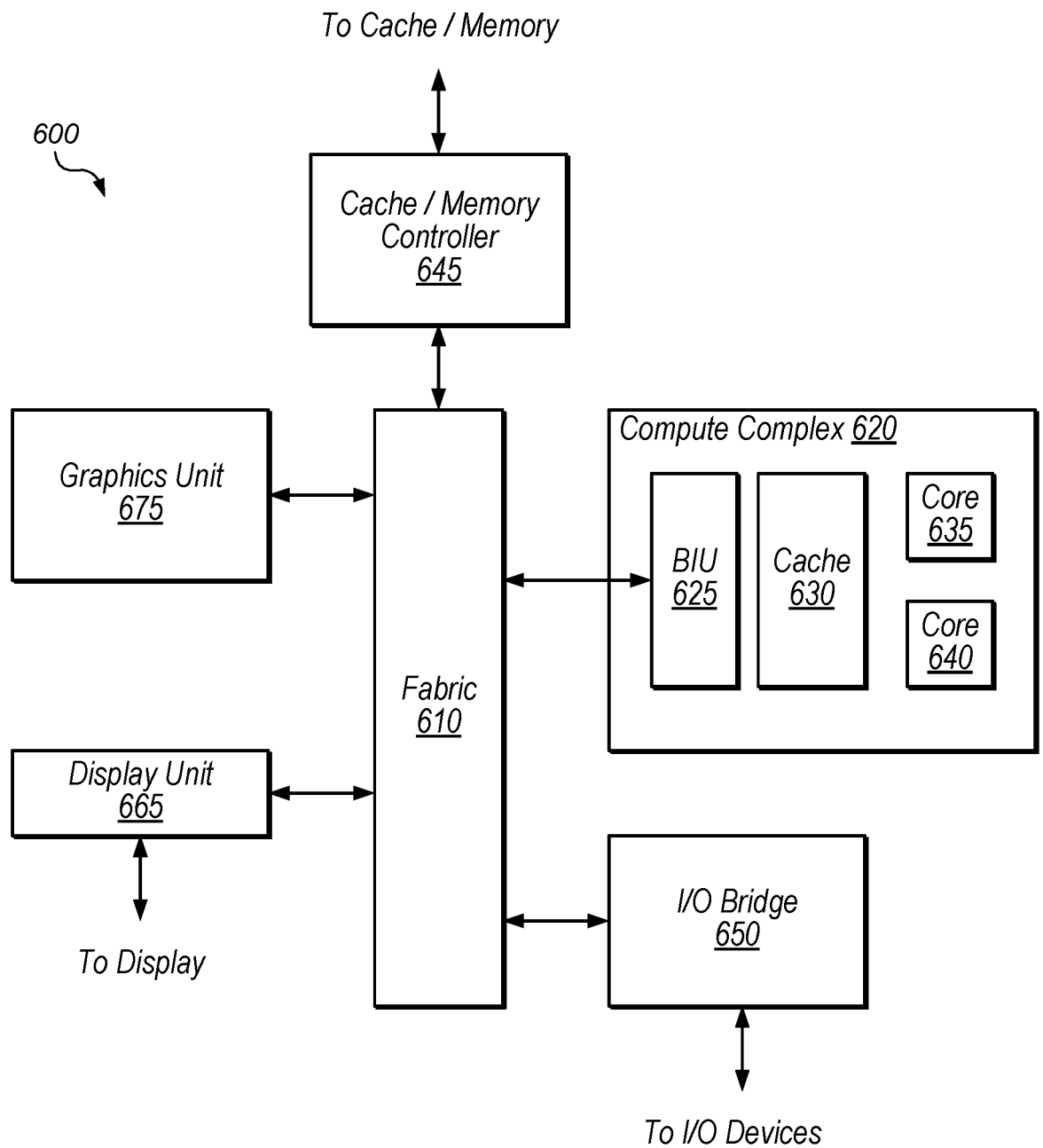
FIG. 6 is a block diagram illustrating an example computing device, according to some embodiments.

Referring now to FIG. 6, a block diagram illustrating an example embodiment of a device 600 is shown. In some embodiments, elements of device 600 may be included within a system on a chip. In some embodiments, device 600 may be included in a mobile device, which may be battery-powered. Therefore, power consumption by device 600 may be an important design consideration. In the illustrated embodiment, device 600 includes fabric 610, compute complex 620 input/output (I/O) bridge 650, cache/memory controller 645, graphics unit 675, and display unit 665. In some embodiments, device 600 may include other components (not shown) in addition to or in place of the illustrated components, such as video processor encoders and decoders, image processing or recognition elements, computer vision elements, etc.

Fabric 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally.

In the illustrated embodiment, compute complex 620 includes bus interface unit (BIU) 625, cache 630, and cores 635 and 640. In various embodiments, compute complex 620 may include various numbers of processors, processor cores and caches. For example, compute complex 620 may include 1, 2, or 4 processor cores, or any other suitable number. In one embodiment, cache 630 is a set associative L2 cache. In some embodiments, cores 635 and 640 may include internal instruction and data caches. In some embodiments, a coherency unit (not shown) in fabric 610, cache 630, or elsewhere in device 600 may be configured to maintain coherency between various caches of device 600. BIU 625 may be configured to manage communication between compute complex 620 and other elements of device 600. Processor cores such as cores 635 and 640 may be configured to execute instructions of a particular instruction set architecture (ISA) which may include operating system instructions and user application instructions.

Cache/memory controller 645 may be configured to manage transfer of data between fabric 610 and one or more caches and memories. For example, cache/memory controller 645 may be coupled to an L3 cache, which may in turn be coupled to a system memory. In other embodiments, cache/memory controller 645 may be directly coupled to a memory. In some embodiments, cache/memory controller 645 may include one or more internal caches.

As used herein, the term "coupled to" may indicate one or more connections between elements, and a coupling may include intervening elements. For example, in FIG. 6, graphics unit 675 may be described as "coupled to" a memory through fabric 610 and cache/memory controller 645. In contrast, in the illustrated embodiment of FIG. 6, graphics unit 675 is "directly coupled" to fabric 610 because there are no intervening elements.

Graphics unit 675 may include one or more processors, e.g., one or more graphics processing units (GPU's). Graphics unit 675 may receive graphics-oriented instructions, such as OPENGL®, Metal, or DIRECT3D® instructions, for example. Graphics unit 675 may execute specialized GPU instructions or perform other operations based on the received graphics-oriented instructions. Graphics unit 675 may generally be configured to process large blocks of data in parallel and may build images in a frame buffer for output to a display, which may be included in the device or may be a separate device. Graphics unit 675 may include transform, lighting, triangle, and rendering engines in one or more graphics processing pipelines. Graphics unit 675 may output pixel information for display images. Graphics unit 675, in various embodiments, may include programmable shader circuitry which may include highly parallel execution cores configured to execute graphics programs, which may include pixel tasks, vertex tasks, and compute tasks (which may or may not be graphics-related).

Display unit 665 may be configured to read data from a frame buffer and provide a stream of pixel values for display. Display unit 665 may be configured as a display pipeline in some embodiments. Additionally, display unit 665 may be configured to blend multiple frames to produce an output frame. Further, display unit 665 may include one or more interfaces (e.g., MIPI® or embedded display port (eDP)) for coupling to a user display (e.g., a touchscreen or an external display).

I/O bridge 650 may include various elements configured to implement: universal serial bus (USB) communications, security, audio, and low-power always-on functionality, for example. I/O bridge 650 may also include interfaces such as pulse-width modulation (PWM), general-purpose input/output (GPIO), serial peripheral interface (SPI), and inter-integrated circuit (I2C), for example. Various types of peripherals and devices may be coupled to device 600 via I/O bridge 650.

In some embodiments, device 600 includes network interface circuitry (not explicitly shown), which may be connected to fabric 610 or I/O bridge 650. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 600 with connectivity to various types of other devices and networks.

Example Applications

Figure 7:
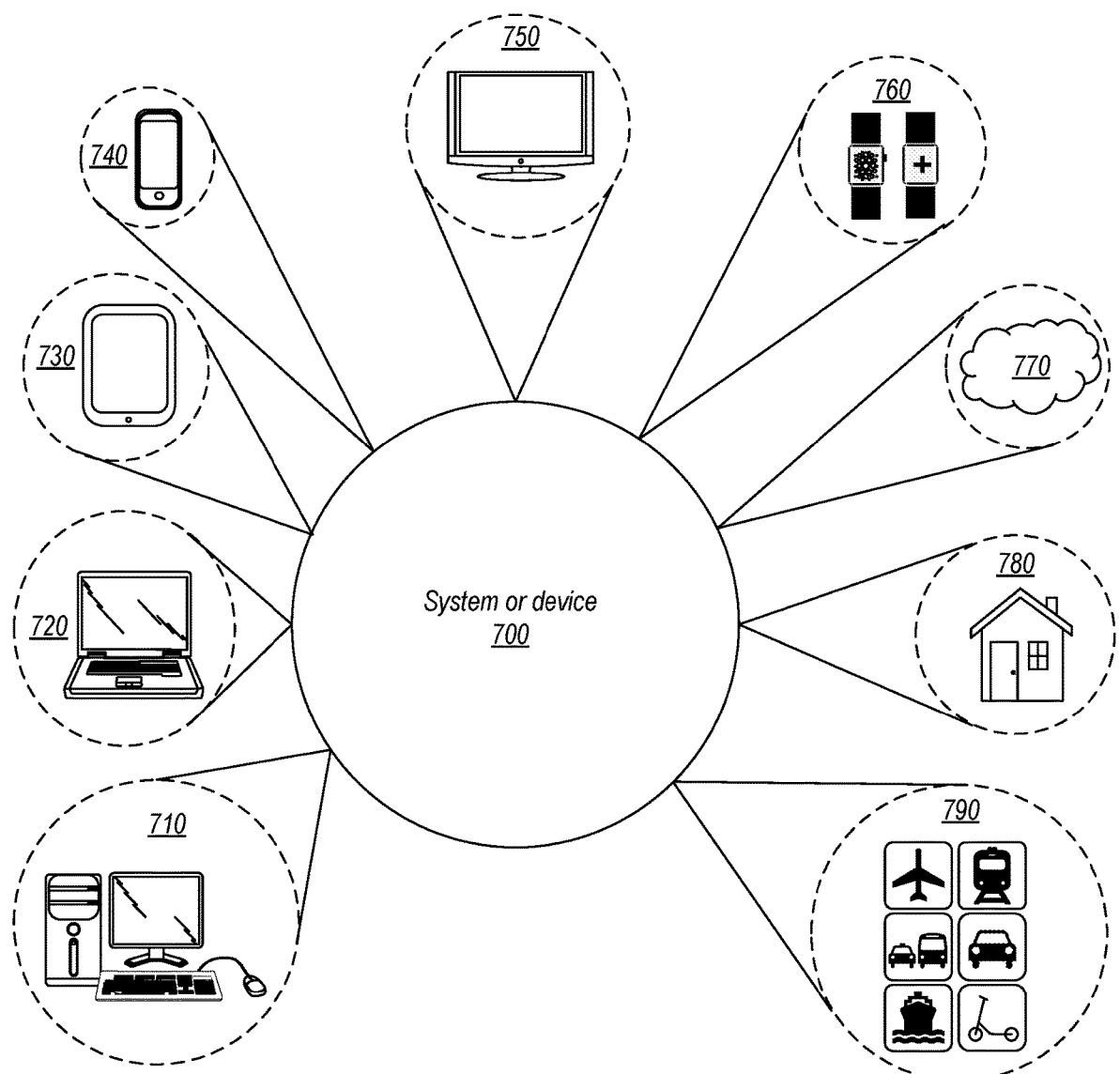
FIG. 7 is a diagram illustrating example applications of disclosed systems and devices, according to some embodiments.

Turning now to FIG. 7, various types of systems that may include any of the circuits, devices, or system discussed above. System or device 700, which may incorporate or otherwise utilize one or more of the techniques described herein, may be utilized in a wide range of areas. For example, system or device 700 may be utilized as part of the hardware of systems such as a desktop computer 710, laptop computer 720, tablet computer 730, cellular or mobile phone 740, or television 750 (or set-top box coupled to a television).

Similarly, disclosed elements may be utilized in a wearable device 760, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 700 may also be used in various other contexts. For example, system or device 700 may be utilized in the context of a server computer system, such as a dedicated server or on shared hardware that implements a cloud-based service 770. Still further, system or device 700 may be implemented in a wide range of specialized everyday devices, including devices 780 commonly found in the home such as refrigerators, thermostats, security cameras, etc. The interconnection of such devices is often referred to as the "Internet of Things" (IoT). Elements may also be implemented in various modes of transportation. For example, system or device 700 could be employed in the control systems, guidance systems, entertainment systems, etc. of various types of vehicles 790.

The applications illustrated in FIG. 7 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 8:
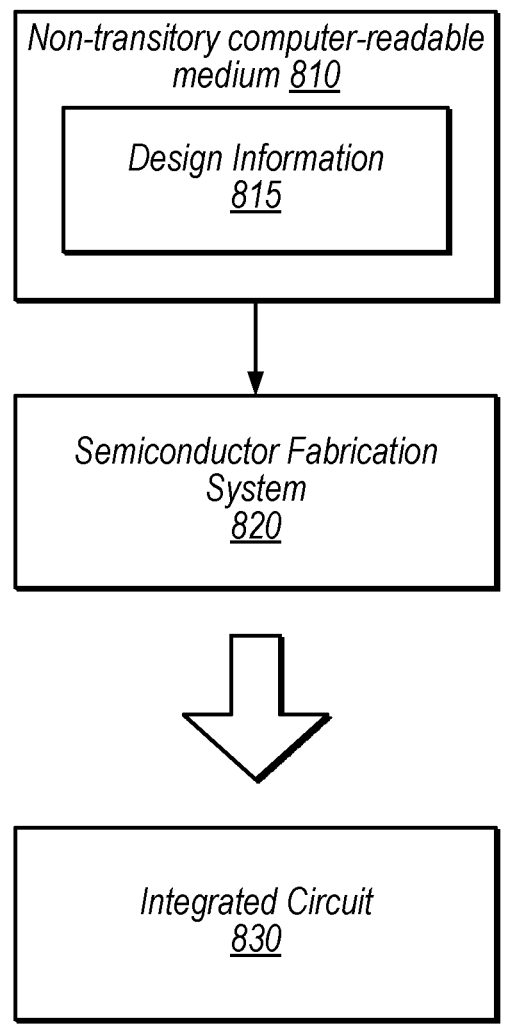
FIG. 8 is a block diagram illustrating an example computer-readable medium that stores circuit design information, according to some embodiments.

FIG. 8 is a block diagram illustrating an example non-transitory computer-readable storage medium that stores circuit design information, according to some embodiments. In the illustrated embodiment semiconductor fabrication system 820 is configured to process the design information 815 stored on non-transitory computer-readable medium 810 and fabricate integrated circuit 830 based on the design information 815.

Non-transitory computer-readable storage medium 810, may comprise any of various appropriate types of memory devices or storage devices. Non-transitory computer-readable storage medium 810 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 810 may include other types of non-transitory memory as well or combinations thereof. Non-transitory computer-readable storage medium 810 may include two or more memory mediums which may reside in different locations, e.g., in different computer systems that are connected over a network.

Design information 815 may be specified using any of various appropriate computer languages, including hardware description languages such as, without limitation: VHDL, Verilog, SystemC, SystemVerilog, RHDL, M, MyHDL, etc. Design information 815 may be usable by semiconductor fabrication system 820 to fabricate at least a portion of integrated circuit 830. The format of design information 815 may be recognized by at least one semiconductor fabrication system 820. In some embodiments, design information 815 may also include one or more cell libraries which specify the synthesis, layout, or both of integrated circuit 830. In some embodiments, the design information is specified in whole or in part in the form of a netlist that specifies cell library elements and their connectivity. Design information 815, taken alone, may or may not include sufficient information for fabrication of a corresponding integrated circuit. For example, design information 815 may specify the circuit elements to be fabricated but not their physical layout. In this case, design information 815 may need to be combined with layout information to actually fabricate the specified circuitry.

Integrated circuit 830 may, in various embodiments, include one or more custom macrocells, such as memories, analog or mixed-signal circuits, and the like. In such cases, design information 815 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform various testing of fabricated circuits for correct operation.

In various embodiments, integrated circuit 830 is configured to operate according to a circuit design specified by design information 815, which may include performing any of the functionality described herein. For example, integrated circuit 830 may include any of various elements shown in FIGS. 1B, 2-3, and 6. Further, integrated circuit 830 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed. FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
  position determination circuitry configured to:
    receive an input vector that orders a set of potential candidates from a highest-priority position within the input vector to a lowest priority position within the input vector; and
    determine, starting from a first end of the input vector and based on non-overlapping groups of candidates, a particular position within the input vector at which a threshold number of available candidates are found, wherein to determine the particular position, the position determination circuitry is configured to:
      generate respective count values within the non-overlapping groups of candidates, identify a transition group in which the particular position is located based on accumulation of the respective count values, and identify the particular position within the transition group;
  the apparatus further comprising output circuitry configured to generate, based on the particular position, an output vector that indicates the threshold number of available candidates from the input vector.

2. The apparatus of claim 1, wherein respective groups of the non-overlapping groups of candidates include a number of candidates that equals the threshold number of available candidates.

3. The apparatus of claim 2, wherein the input vector includes a bit per candidate that indicates whether the candidate is valid.

4. The apparatus of claim 1, wherein the position determination circuitry includes count array circuitry configured to:
  generate, for at least the transition group, a count array indicating a cumulative number of available candidates at each position in the transition group, starting at an end of the group that is closest to the first end of the input vector.

5. The apparatus of claim 4, wherein the identification of the particular position within the transition group is based on the count array for the transition group and the accumulated count from an adjacent group to the transition group that is nearer to the first end of the input vector.

6. The apparatus of claim 5, wherein the particular position is the position at which a sum of the count array value for that position and the accumulated count from the adjacent group meets the threshold number of candidates.

7. The apparatus of claim 4, wherein the count array circuitry is configured to generate respective count arrays for multiple groups of the non-overlapping groups of candidates and is configured to generate the respective count arrays at least partially in parallel with generation of the respective count values.

8. The apparatus of claim 1, wherein the position determination circuitry includes:
  multiple compressors and one or more half adders configured to generate the respective count values within groups of candidates; and
  parallel prefix network circuitry configured to accumulate the respective count values starting from the first end of the input vector.

9. The apparatus of claim 8, wherein the parallel prefix network circuitry implements one of the following topologies: Ladner-Fischer, Brent-Kung, Kogge-Stone, or Han-Carlson.

10. The apparatus of claim 1, wherein the output vector indicates the threshold number of highest-priority available candidates from the input vector.

11. The apparatus of claim 1, wherein the output circuitry is configured to generate a mask based on the determined position and to apply the mask to the input vector to generate the output vector.

12. The apparatus of claim 1, wherein the apparatus is a computing device that includes:
  a central processing unit;
  a display; and
  network interface circuitry.

13. A method, comprising:
  receiving, by position determination circuitry, an input vector that orders a set of potential candidates from a highest-priority position within the input vector to a lowest priority position within the input vector;
  determining, by the position determination circuitry starting from a first end of the input vector and based on non-overlapping groups of candidates, a particular position within the input vector at which a threshold number of available candidates are found, wherein the determining includes:
    generating respective count values within the non-overlapping groups of candidates;
    identifying a transition group in which the particular position is located based on accumulation of the respective count values; and
    identifying the particular position within the transition group; and
  generating, based on the particular position, an output vector that indicates the threshold number of available candidates from the input vector.

14. The method of claim 13, further comprising:
  generating, for at least the transition group, a count array indicating a cumulative number of available candidates at each position in the transition group, starting at an end of the transition group that is closest to the first end of the input vector.

15. The method of claim 14, wherein the identifying the particular position within the transition group is based on the count array for the transition group and the accumulated count from an adjacent group to the transition group that is nearer to the first end of the input vector.

16. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:
  position determination circuitry configured to:
    receive an input vector that orders a set of potential candidates from a highest-priority position within the input vector to a lowest priority position within the input vector; and
    determine, starting from a first end of the input vector and based on non-overlapping groups of candidates, a particular position within the input vector at which a threshold number of available candidates are found, wherein to determine the particular position, the position determination circuitry is configured to:
      generate respective count values within the non-overlapping groups of candidates, identify a transition group in which the particular position is located based on accumulation of the respective count values, and identify the particular position within the transition group;
  the circuit further comprising output circuitry configured to generate, based on the particular position, an output vector that indicates the threshold number of available candidates from the input vector.

17. The non-transitory computer readable storage medium of claim 16, wherein the position determination circuitry includes count array circuitry configured to:
  generate, for at least the transition group, a count array indicating a cumulative number of available candidates at each position in the transition group, starting at an end of the group that is closest to the first end of the input vector.

18. The non-transitory computer readable storage medium of claim 17, wherein the identification of the particular position within the transition group is based on the count array for the transition group and the accumulated count from an adjacent group to the transition group that is nearer to the first end of the input vector.

19. The non-transitory computer readable storage medium of claim 17, wherein the count array circuitry is configured to generate respective count arrays for multiple groups of the non-overlapping groups of candidates and is configured to generate the respective count arrays at least partially in parallel with generation of the respective count values.

20. The non-transitory computer readable storage medium of claim 16, wherein the position determination circuitry includes:
  multiple compressors and one or more half adders configured to generate the respective count values within groups of candidates; and
  parallel prefix network circuitry configured to accumulate the respective count values starting from the first end of the input vector.

* * * * *